Dec. 29, 1964 D. E. MEIER 3,163,815

ADJUSTABLE SIGNAL RANGE LIMITING DEVICE UTILIZING TRANSFORMER LOADING

Filed Jan. 29, 1962

INVENTOR.
DON E. MEIER

BY Moody and Harris

ATTORNEYS 3,163,815
Patented Dec. 29, 1964

3,163,815

ADJUSTABLE SIGNAL RANGE LIMITING DEVICE UTILIZING TRANSFORMER LOADING

Don E. Meier, Marion, Iowa, assignor to Collins Radio Company, Cedar Rapids, Iowa, a corporation of Iowa Filed Jan. 29, 1962, Ser. No. 169,246
3 Claims. (Cl. 323—89)

Figure 1:
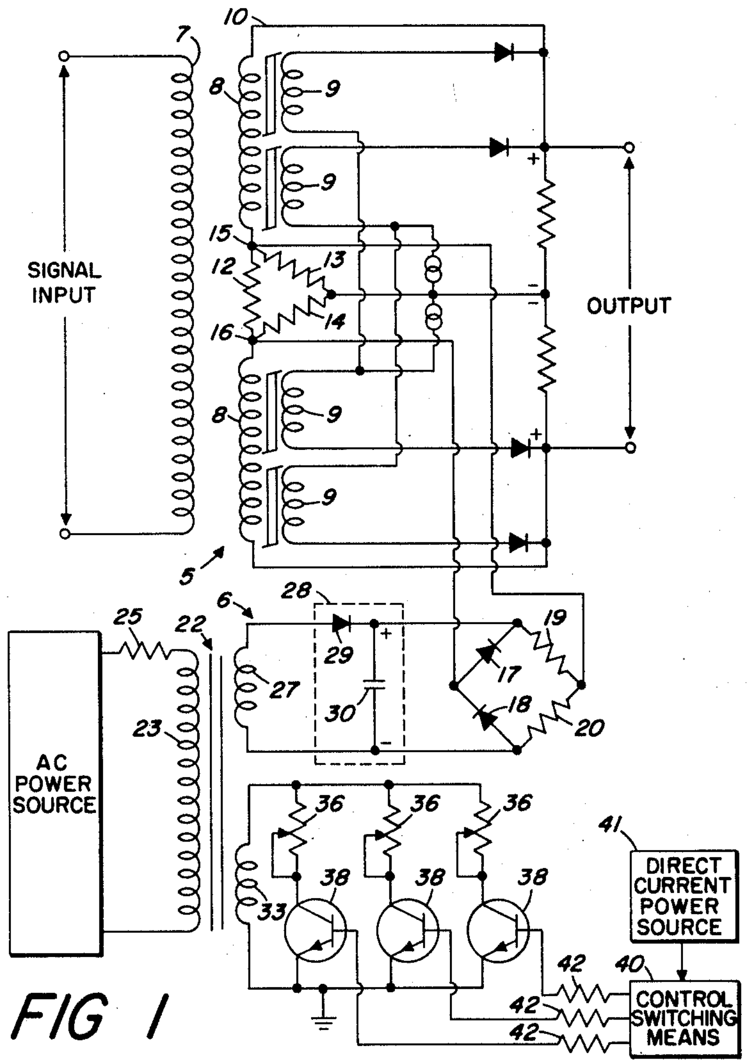

This invention relates to an adjustable signal range limiting device and more particularly to a limit determining voltage generating device capable of providing direct voltage the magnitude of which is controlled by transformer loading.

In utilizing electronic equipments, it is often desirable, and in some cases mandatory, to provide means for establishing a maximum signal level, usually by limiting the gain in an amplifying state. This limit may vary, however, due to changing conditions imposed upon the equipment or utilization of the equipment, or amplifying stages therein, for different functions. This has been particularly true in automatic flight control equipment where it has been found desirable to limit the gain of at least some of the magnetic amplifiers therein, but where it has also been found undesirable that such a limit be constant under all conditions and for all functions.

As is well known in the art, the gain of a magnetic amplifier may be controlled by a degenerative feedback loop that includes a feedback winding and a serially connected feedback resistor. Also, as described in copending United States Patent Application Serial Number 818,496, entitled "Automatic Pilot Control Equipment," filed April 22, 1959 by Henry W. Patton and assigned to the assignee of the present invention, now United States Patent No. 3,038,114, by connecting a pair of oppositely poled diodes in parallel with the feedback resistor the backbias on the diodes establishes a gain limit for the magnetic amplifier regardless of the polarity of the signal.

The present invention provides a highly suitable means for adjustably backbiasing one or more diodes connected in parallel with electronic components to be bypassed at a predetermined maximum voltage level, such as, for example, the gain determining resistor of a magnetic amplifier. It is a feature of this invention that the direct voltage coupled to such a diode is made adjustable by transformer loading.

It is therefore an object of this inveniton to provide a novel means for achieving signal limiting over a range that may be adjusted as desired.

More particularly it is an object of this invention to provide an adjustable signal range limiting device utilizing transformer loading.

Still more particularly it is an object of this invention to provide an adjustable signal level limiting device wherein a transformer is adjustably loaded by electronic switching means.

With these and other objects in view which will become apparent to one skilled in the art as the description proceeds, this invention resides in the novel construction, combination and arrangement of parts substantially as hereinafter described and more particularly defined by the appended claims, it being understood that such changes in the precise embodiment of the herein disclosed invention may be included as come within the scope of the claims.

Figure 2:
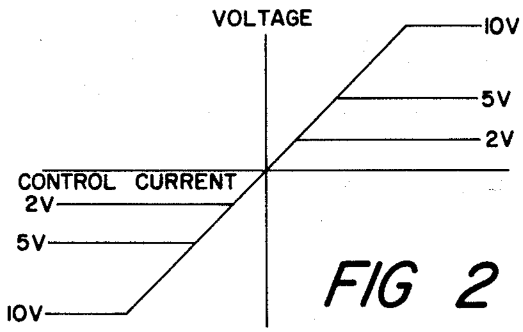

The accompanying drawing illustrates one complete example of the embodiment of the invention constructed according to the best mode so far devised for the practical application of the principles thereof, and in which:

FIGURE 1 is a partial schematic diagram of the adjustable signal range limiting device of this invention shown connected to a conventional magnetic amplifier, and FIGURE 2 is a typical graphical illustration of input current versus output voltage illustrating adjustable limiting in the circuit of FIGURE 1 with diverse transformer loading.

Referring now to the drawings, the numeral 5 indicates generally a conventional magnetic amplifier, while the numeral 6 indicates generally the adjustable signal range limiting device of this invention.

As shown in FIGURE 1, magnetic amplifier 5 includes a signal input control winding 7, a pair of control feedback windings 8 and four power windings 9. As is well known in the art and as indicated in FIGURE 1, the core materials of the magnetic amplifier have substantially rectangular hysteresis characteristics and are, of course, retentive in nature. Feedback windings 8 form a part of degenerative gain determining feedback loop 10, which loop also includes feedback resistor 12. As shown in FIGURE 1, biasing resistors 13 and 14 are also connected in parallel with feedback resistor 12 at junctions 15 and 16. As is well known in the art, if a short circuit is connected between junctions, or terminals, 15 and 16, the gain of the magnetic amplifier shown in FIGURE 1 drops essentially to zero.

A pair of oppositely poled diodes 17 and 18, connected in series with resistors 19 and 20, respectively, are connected between junctions 15 and 16. With no backbiasing on diodes 17 and 18, one of the two diodes would be conductive, depending upon the polarity of a signal in the feedback path, and serve to essentially short out the feedback resistor (resistors 19 and 20 being small current limiting resistors) at all times. However, by placing a predetermined voltage of the proper polarity on diodes 17 and 18, a threshold, or limit, is established since the diode will be nonconductive until the backbias is overcome. By varying the backbias on the diodes, the limit is accordingly varied, as indicated in FIGURE 2.

It is a feature of this invention to provide novel means for establishing an adjustable range limit by backbiasing diodes 17 and 18 as desired by transfromer loading. To accomplish this end, a transformer 22 has its primary 23 connected to an alternating current power source, which connection is made through resistor 25 to assure a current source rather than a voltage source, that is, a high impedance rather than a low impedance source.

Secondary winding 27 of transformer 22 is connected to rectifier 28, which rectifier includes a diode 29 and a capacitor 30. The direct voltage output from rectifier 28 is coupled to diodes 17 and 18 with the proper polarity to backbias the diodes, as indicated in FIGURE 1. The backbiasing voltage impressed upon diodes 17 and 18 will, of course, be dependent upon the voltage coupled to the rectifier through secondary winding 27 of transformer 22.

When utilizing a current source to energize transformer 22, the voltage coupled to secondary 27 may be varied by loading at least one other secondary winding. Thus, as shown in FIGURE 1, by connecting secondary winding 33 to an increased load, more current is caused to flow through primary winding 23 which, in turn, causes an increased voltage drop across resistor 25. This reduces the voltage across primary winding 23 causing a proportional reduction in voltage across secondary winding 27 and results in a lower backbias voltage on diodes 17 and 18.

Loading of secondary winding 33 of transformer 22 is preferably accomplished through the use of a plurality of parallel connected resistors 36, which resistors are individually connected into the load circuit as needed by means of a like plurality of transistor switches 38. As shown in FIGURE 1, the resistors may be variable if desired.

It is to be appreciated, however, that while three resistors and three transistor switches are shown, this invention is not meant to be limited thereto since any number could be utilized depending upon the range of loading desired for any particular application. It is also to be appreciated that, while solid state switches are shown and described herein connecting resistor 36 in parallel to a single winding 33, the invention is not meant to be limited thereto, since, for example, each resistor could be connected to a separate secondary winding, the desired isolation achieved through the use of the transformer still being retained.

Transistors 38 are in a normally nonconductive state so that the resistor 36 connected in series therewith is normally not in the load circuit. When it is desired to place a predetermined load on secondary 33, switching voltage is coupled to the base of the transistor connected in series therewith to change the transistor to a conductive state thereby inserting the resistor into the load circuit. As shown in FIGURE 1, by closing a conventional switch (not shown) in control switching means 40 the base of the transistor may be connected to direct current power source 41 through a current limiting resistor 42.

The values of resistors 36 may be varied depending upon the particular application and thus by switching a single resistor, or a plurality of resistors if necessary, into the load circuit, any predetermined value can be readily realized, the total load, of course, being calculated from the usual basic formula for parallel connected resistors when applicable.

As shown typically in FIGURE 2, so long as the amplifier does not exceed the preselected range limit, the amplifier operates in conventional fashion. When the range limit is reached, either diode 17 or 18 changes to a conductive state, depending upon polarity in the feedback loop, and the feedback resistor is essentially shorted. The range limit is, in turn, governed by the loading of transformer 22, which loading may be readily varied from a remote location by controlling the state of the transistor switches.

From the foregoing, it should be obvious to one skilled in the art that the device of this invention provides a novel means utilizing transformer loading to establish an adjustable signal range limit.

What is claimed as my invention is:

1. An adjustable level electronic bypassing device utilizing transformer loading, said device comprising: a transformer having a primary winding and a pair of secondary windings; means adapting said primary winding for connection to an alternating current source; rectifying means connected to one of said secondary windings; diode means connected to receive the direct voltage output from said rectifying means to backbias said diode means; resistance means; means for connecting said resistance means to the other said secondary winding in a manner so as to adjustably control the loading of said transformer to thereby control the backbias on said diode means; and terminal means connected to said diode means so that a short substantially exists across said terminal means whenever a signal impressed thereon exceeds the backbias of said diode means.

2. In a magnetic amplifier circuit having a feedback loop including gain determining resistance means, an adjustable output signal magnitude limiting device utilizing transformer loading, said device comprising: a transformer having a primary winding and a pair of secondary windings; means adapting said primary winding for connection to an alternating current source; rectifying means connected to one of said secondary windings; diode means connected to receive the direct voltage output from said rectifying means to backbias said diode means; resistance means; means for connecting said resistance means to the other said secondary winding in a manner so as to adjustably control the loading of said transformer to thereby control the backbias on said diode means; and means connecting said diode means in parallel with the gain determining resistance means of the feedback loop of the magnetic amplifier to substantially short out said gain determining resistance means whenever the magnitude of a signal impressed thereon exceeds the backbias of said diode means.

3. The device of claim 2 wherein said resistance means includes a plurality of resistors, and wherein said means for connecting said resistance means to the other said secondary winding includes a plurality of transistors each of which is connected in series with a different one of said resistors whereby the connection of said resistors to said other secondary winding is individually controlled by the state of the transistor connected in series therewith.

References Cited in the file of this patent

UNITED STATES PATENTS

| | | |
|---|---|---|
| 2,464,287 | Beamer | Mar. 15, 1949 |
| 2,686,290 | Macklem | Aug. 10, 1954 |
| 3,036,262 | Welch | May 22, 1962 |